United States Patent [19]
Graham

[11] Patent Number: 5,899,652
[45] Date of Patent: May 4, 1999

[54] HAY BALE TRANSPORTER

[76] Inventor: Norman J. Graham, 37525 John Lanier Rd., Walker, La. 70785

[21] Appl. No.: 09/060,775

[22] Filed: Apr. 15, 1998

[51] Int. Cl.⁶ .................................................. A01D 90/00
[52] U.S. Cl. ........................................ 414/24.5; 414/492
[58] Field of Search .................................. 414/24.5, 24.6, 414/480, 492

[56]  References Cited

U.S. PATENT DOCUMENTS

| | | |
|---|---|---|
| 4,120,405 | 10/1978 | Jones et al. . |
| 4,128,179 | 12/1978 | Gilbert . |
| 4,194,863 | 3/1980 | Vansickle et al. . |
| 4,318,653 | 3/1982 | Benefield et al. . |
| 4,334,817 | 6/1982 | Vansickle et al. . |
| 4,630,986 | 12/1986 | Taylor ..................................... 414/24.5 |
| 5,062,757 | 11/1991 | Eichenauer ............................. 414/24.5 |
| 5,676,513 | 10/1997 | Bingham ................................ 414/24.5 |

FOREIGN PATENT DOCUMENTS

| | | | |
|---|---|---|---|
| 1201690 | 3/1986 | Canada ................................ | 414/24.5 |
| 2040865 | 9/1980 | United Kingdom .................. | 414/24.5 |
| WO 83/03332 | 10/1983 | WIPO .................................... | 414/24.5 |

*Primary Examiner*—William E. Terrell
*Assistant Examiner*—Gregory A Morse
*Attorney, Agent, or Firm*—Browning Bushman

[57]  ABSTRACT

A hay bale transporter apparatus and method are disclosed that provide a complete system for loading, unloading, and transport of large diameter type hay bales. The hay bale transporter may be utilized to handle individual hay bales or may be used to handle multiple hay bales simultaneously, including unloading or pickup thereof. The hay bale transporter includes a transport frame to which is pivotally secured, preferably on a lateral side thereof, a bale fork for lifting bales of hay onto a cradle. The cradle slidingly supports the hay bales and is pivotally mounted to the transport frame for unloading and pickup of single or multiple bales. A cylindrical hay bale or stack of hay bales may be picked up by means of a fork fixably secured to the cradle so that the transport frame is backed up with the cradle in the vertical position for pickup. In one embodiment of the invention, stabilizer arms secured to the cradle are provided to close around one or more hay bales.

24 Claims, 9 Drawing Sheets

HAY BALE TRANSPORTER

BACKGROUND OF THE INVENTION

Field of the Invention

The present invention relates generally to transporting assemblies and, more particularly, to apparatus and methods especially suitable for transporting large hay bales.

Description of the Background

Large diameter hay bales are increasingly sold, transported, and utilized by farmers in the United States and other countries. Typical uses for large diameter bales include feeding livestock, such as cattle. Because numerous large diameter hay bales may be used on a typical farm, it is often desirable to move several hay bales at a time. However, prior art devices are normally limited to moving only one hay bale at a time. Therefore, movement of hay bales requires a significant amount of time, such as for spreading or collecting hay bales. This time is normally spent with expensive farm machinery, such as tractors, that could be utilized for other purposes. Furthermore, prior art devices are not suitable for working with stacked bales in the sense of being able to unload or load an entire stack of hay bales at once to thereby greatly reduce operating times. Prior art devices are also sometimes hazardous to operate because the large, heavy hay bales are sometimes positioned for transport directly above the operator's tractor, where they could easily fall on the operator's tractor due to bumping of rough ground if a spear or grabbing device is not secure. Some prior art devices require more than one operator. Most prior art devices are not only inherently slow in picking up or unloading multiple bales of hay, but also lack sufficient versatility as to placement capabilities, stacking of the bales, and so forth. Prior art devices are also often limited in their ability to adapt to significant variations in sizes of the large, bulky hay bales. Large diameter hay bales are typically cylindrical but occasionally are made in other shapes. Hay bales may average in size from about four to about seven feet in diameter and may weigh from about 600 lbs. to about 4,000 lbs. The lengths of the hay bales may also vary.

The following patents describe the attempts that other inventors have made toward various problems with transporting hay bales, such as the problems discussed above:

U.S. Pat. No. 4,334,817, issued Jun. 15, 1982, to Vansickle et al., discloses a loading apparatus that has a pair of wing members for grasping the circular bases of a single cylindrical hay bale. The wing members have the inner end pivotally secured to a tractor pivot point and are generally parallel and spaced apart sufficiently to engage the ends of, apparently, a typical size cylindrical hay bale.

U.S. Pat. No. 4,120,405, issued Oct. 17, 1978, to Jones et al., discloses a spear-type tractor-attached hay bale pickup device that apparently is designed for carrying only one hay bale at a time. It connects to either the front or the back of a tractor. A device for impaling and lifting hay bales consists of a long, round, pencil-pointed shaft plus two shorter shafts of similar design protruding to each side of the main impaling spear for the purpose of stabilizing the bale in the process of loading and handling.

U.S. Pat. No. 4,318,653, issued Mar. 9, 1982, to Benefield et al., also discloses a spear-type tractor-attached hay bale pickup device. Two extension bars extend rearwardly from a tractor and are pivotally connected to a spear mounting plate.

U.S. Pat. No. 4,128,179, issued Dec. 5, 1978, to C. K. Gilbert, discloses a bale loader semi-permanently mounted upon a motor truck for apparent use in carrying only one hay bale at a time. A frame section is attached to a boom operated by a winch. The boom is connected to a three-point bale fork.

U.S. Pat. No. 4,194,863, issued Mar. 25, 1980, to J. D. Vansickle, discloses a bale loader attached to the front of a tractor apparently useful for carrying only one hay bale at a time. A pair of side arms are spaced apart sufficiently to receive a hay bale therebetween for grasping the cylindrical bases on opposite ends of a cylindrical hay bale.

Consequently, there remains a need for a hay bale transportation device that offers faster and more convenient operation, that can handle more than one hay bale at a time, and that can load or unload in different manners, such as with stacks of hay bales or single hay bales. Those skilled in the art have long sought and will appreciate the present invention, which addresses these and other problems.

SUMMARY OF THE INVENTION

The preferred embodiment of the hay bale transporter of the present invention is a complete system that allows a single operator to pickup, transport, and distribute multiple hay bales at a time. The hay bale transporter is preferably supported by wheels and may be attached to a tractor in one preferred embodiment for transport over the farm. In a presently preferred embodiment of the invention, three hay bales or four shorter hay bales may be transported simultaneously. Each hay bale can be quickly picked up and lifted onto the hay bale transporter, where it is then arranged in position on a cradle by a hydraulically driven carriage. Hay bales can be distributed/loaded in a stacked manner or a separately dispersed manner.

In more detail, the hay bale transporter comprises a transport frame for carrying one or more large objects, such as hay bales. The transport frame has front and rear sides and two lateral sides, and is movable in a forward or reverse direction for transporting hay bales from a first location to a second location. A restraining assembly, such as a cradle, is mounted to the transport frame to secure one or more hay bales with respect to the transport frame.

A powered lifting assembly is mounted to one of the two lateral sides of the transport frame and is extendable in a lateral direction from one of the two lateral sides. One or more rigid members, such as fork lift tines, are fixably attached to the powered lifting assembly and are adapted to slide under the large bulky object resting on a surface. The rigid members are mounted for movement by the powered lifting assembly from a first vertical position below the transport frame to a second vertical position above the transport frame. They are also mounted for controlled movement to an inclined orientation when the one or more rigid members are in the second vertical position to thereby urge movement of the large bulky object, such as the hay bale, onto the transport frame. The rigid members are adapted to slide under a hay bale as the transport frame moves in the forward direction.

A carriage is secured to the transport and is profiled to engage the hay bale with extendable spike members mounted to the carriage for controlled insertion into the hay bale. A powered assembly is secured to the transport frame and the carriage to move the carriage in a forward or reverse direction with respect to the transport frame such that movement of the carriage provides for movement of the hay bale along the transport frame from a first region of the transport frame to a second region of the transport frame.

A cradle is mounted to the transport frame and is adapted for receiving the large hay bales and preferably includes at least two rails for receiving the one or more hay bales therebetween. Slip surfaces are secured to the two rails such that the large hay bale slides on the rails. A pivotal connection is provided between the cradle and the transport frame such that the cradle tilts with respect to the transport frame for slidably unloading the large hay bales.

Locking arms are movably secured to the cradle for gripping the large hay bales as the cradle is tilted from a first position to the second position. The arms are pivotally mounted with respect to the cradle to be engageable with the lateral surface of each of the two large hay bales. The arms are movable laterally with respect to the cradle between an open release position and a closed gripping position.

A stacking end is secured to the cradle for supporting weight of the two large hay bales as the cradle is tilted from the first position to the second position. An end pivot connection is provided between the stacking end and the cradle such that the stacking end is pivotal with respect to the cradle.

It is an object of the present invention to provide an improved hay bale transport assembly.

It is another object of the present invention to provide a hay bale transport that may be used to quickly transport multiple numbers of large hay bales.

It is yet another object of the present invention to provide a hay bale transport that can work with stacks of hay bales such that the entire stack of hay bales may be simultaneously unloaded or loaded for transport.

It is yet another object of the present invention to provide a hay bale transport that can quickly stack or spread hay bales as desired.

A feature of the present invention is a carriage for moving hay bales along a cradle that is mounted to a transport frame.

Another feature of the present invention is a cradle that tilts with respect to the transport frame for stacking or spreading hay bales.

Yet another feature of the present invention is a bale lift laterally mounted with respect to the transport frame.

An advantage of the present invention is a large reduction in work time when transporting multiple large hay bales.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
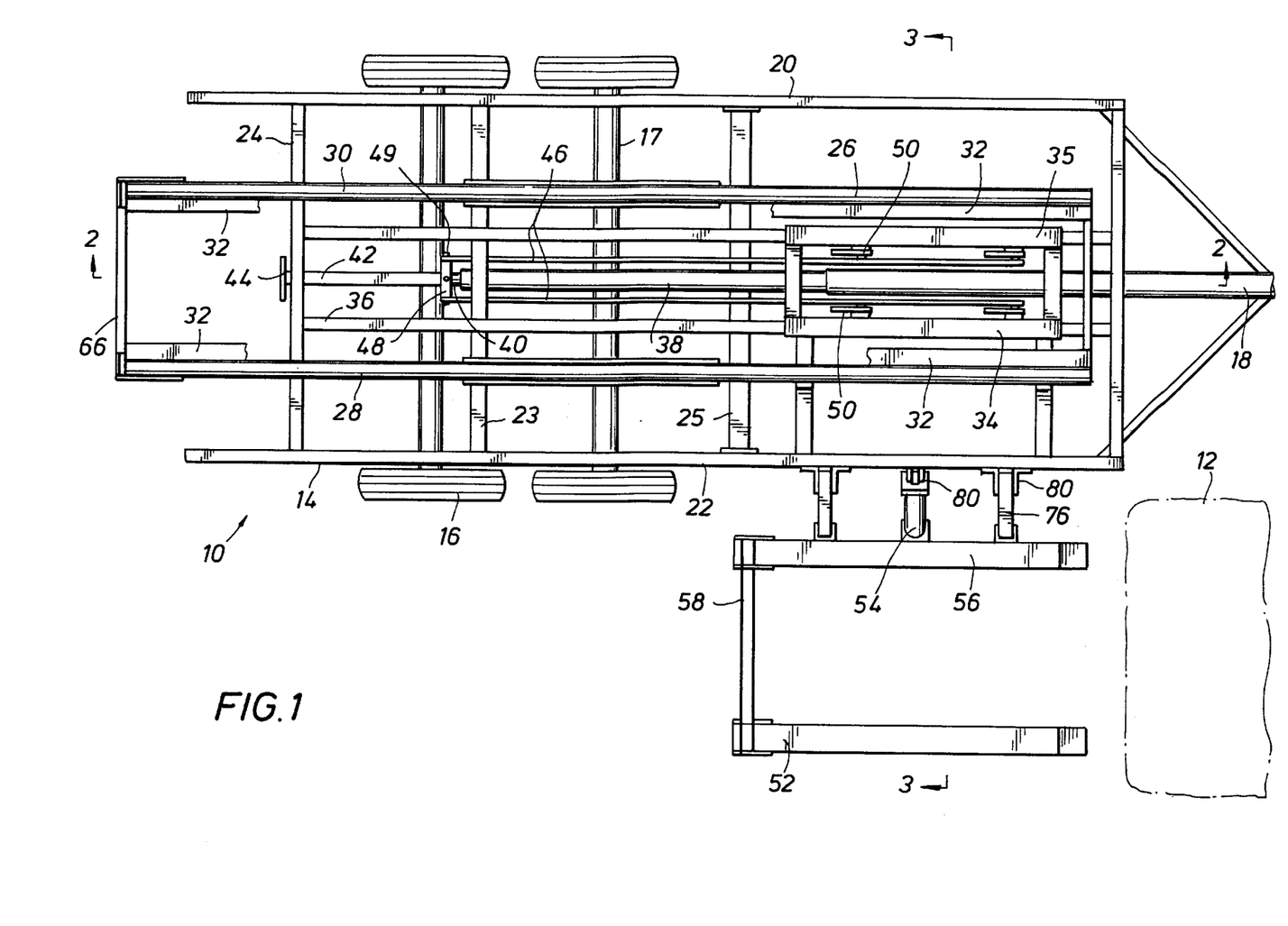
FIG. 1 is a top view of a hay bale transport apparatus in accord with the present invention.

With reference now to the drawings, and more particularly to FIG. 1, a top view of hay bale transporter 10, in accord with the present invention, is illustrated. Although hay bale transporter 10 is specifically designed for use in transporting large, bulky objects such as large diameter hay bales, it will be understood that the present invention is also suitable for transporting other large, bulky objects.

With reference to FIG. 1, transporter 10 is used to transport hay bales, such as indicated hay bale 12. Transporter 10 includes transport frame 14 and is mounted on tandem wheels 16 that are supported on axles 17. Transporter 10 is adapted for connection to a motorized vehicle, such as a tractor, by means of a suitable connection at tongue 18. While hydraulic lines are not shown, it will be understood that they are connected in a standard manner in the general region of tongue 18 for use by the operator and are used to control the approximately three or four hydraulic cylinders or sets of hydraulic cylinders of the presently preferred embodiments as discussed hereinafter. Thus, up to about six to eight hydraulic lines are preferably available at tongue 18 for operation of all features discussed in the preferred embodiments of the present invention. Transport frame 14 has two lateral sides 20 and 22 on the left and right, respectively, as viewed from rear portion 24. Transport frame 14 preferably has several crossbars 23 and 25 to provide adequate strength.

Cradle 26 for receiving hay bales, such as hay bale 12, is comprised of two rails 28 and 30 as well as slip boards 32. Cradle 26 is mounted pivotally to transport frame 14 by suitable connection means including pivot joints/hinges and other suitable connectors as discussed subsequently.

Hay bales are slidingly moved from one position on cradle 26 to another position by means of carriage 34. Carriage 34, in the present embodiment, is comprised of front, rear, and side beams 35 so to be substantially rectangular in the present embodiment. Carriage 34 is supported on beams or tracks 36 and moves in response to activation of hydraulic cylinder 38. Hydraulic cylinder 38 controls shaft 40 to which push rod 42 and plate 44 are secured. Hay dog control links 46 are connected to shaft 40 at brace 48 preferably by pivotal means such as bolts 49. Hay dogs 50 rotate as discussed hereinafter for grabbing the hay bales to be moved by carriage 34.

Figure 4:
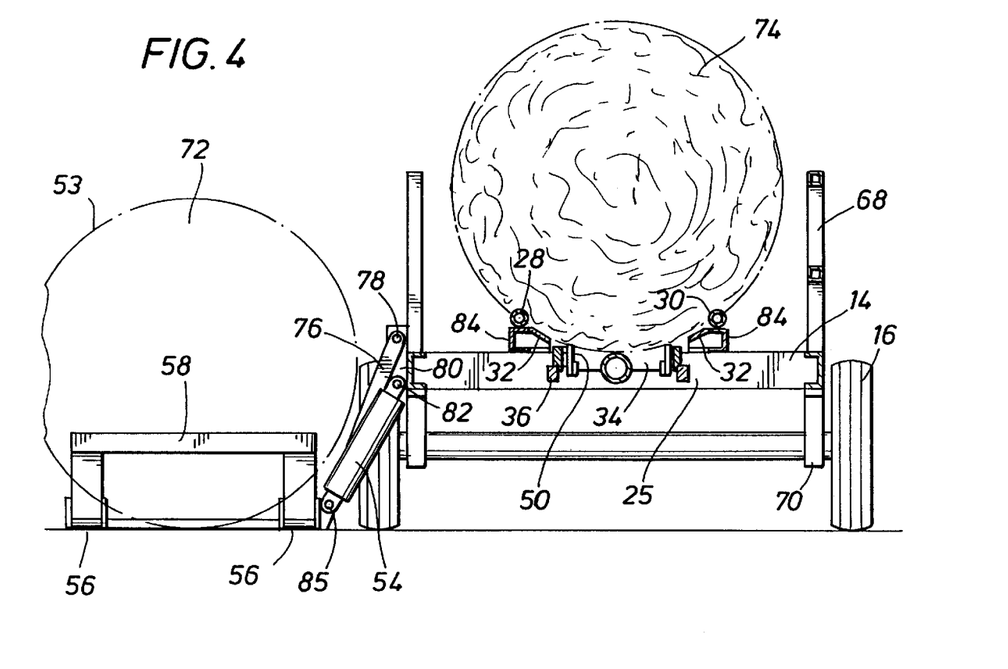
FIG. 4 is an elevational view, partially in section, along line 3—3 of FIG. 1, wherein the lift is in a lower position for picking up a hay bale.

Bale fork or lift 52 is used to hydraulically lift large hay bales onto cradle 26 of transporter 10. Hydraulic cylinder 54 supplies the power for lifting. Preferably at least two fork lift tines 56 are used to slip underneath hay bale 12 as transporter 10 moves forward. Bale stop 58 stops relative movement of bale 12 with respect to fork lift tines 56 as bale 12 is moved onto lift tines 56. Bale or brace stop 58 is also shown in FIG. 4 where the vertical dimensions are visible. For shorter length bales, brace stop 58 can be effectively moved forward in some manner. For instance, a block (not shown) could be placed in front of brace stop 58. Other means to effect the same result, such as movement of brace stop 58 or means for shortening tines 56, could have the same effect.

Figure 2:
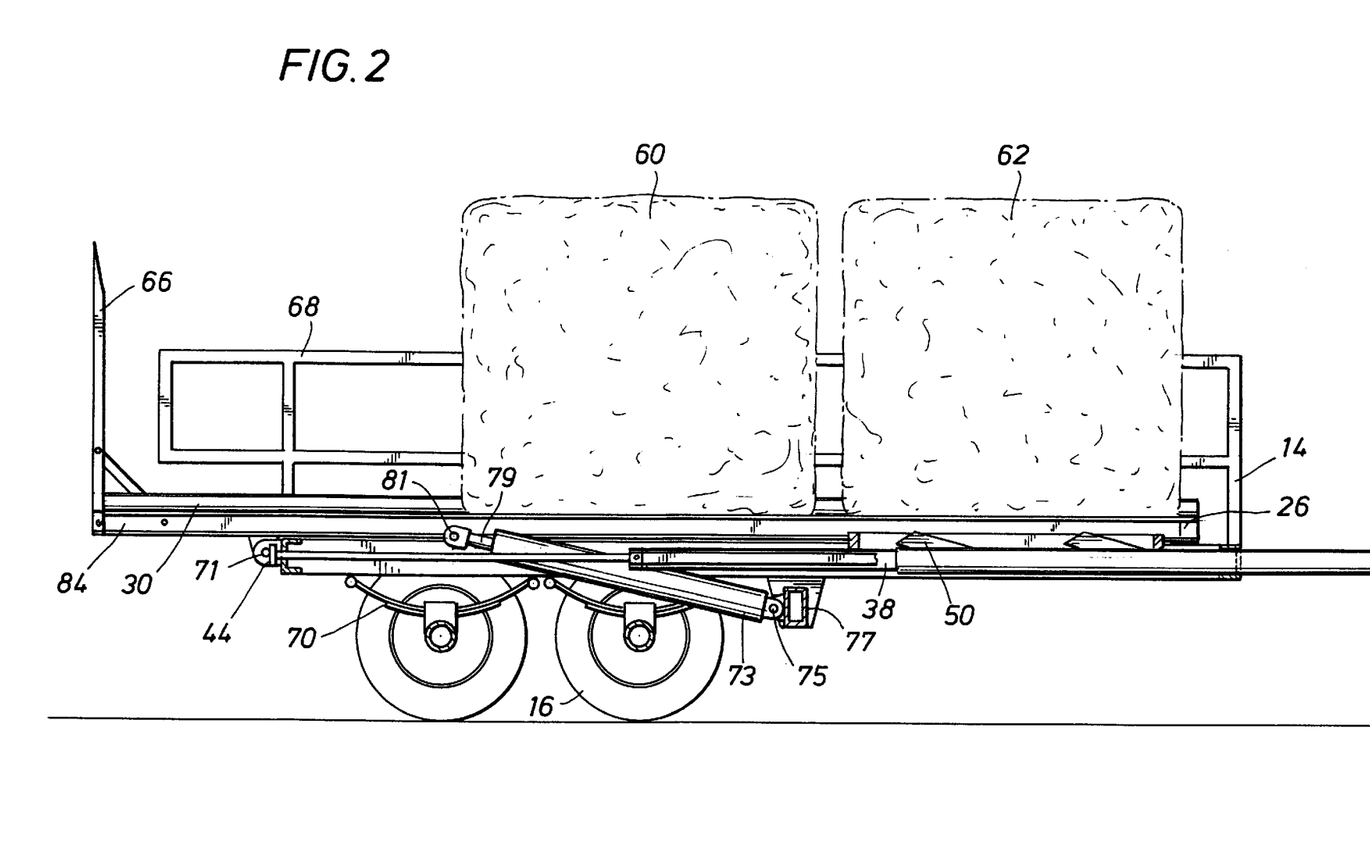
FIG. 2 is an elevational view, partially in section, along line 2—2 of FIG. 1, showing two large diameter type hay bales slidably carried on a cradle of the present invention.
Figure 3:
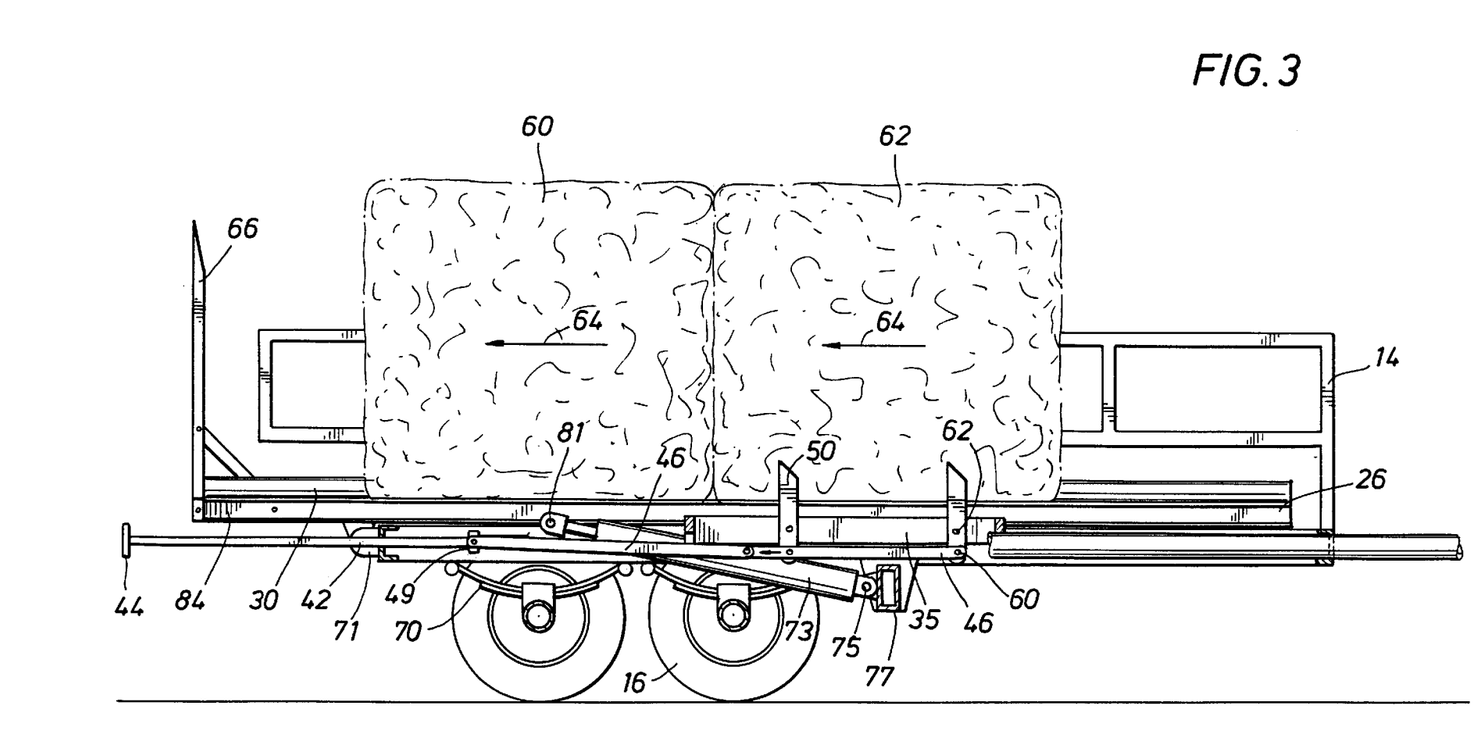
FIG. 3 is an elevational view, partially in section, of the hay bale transport apparatus of FIG. 2 with hay dogs of the carriage extended within a hay bale.

In FIGS. 2 and 3, the operation of hay dogs 50 for moving hay bales 60 and 62 on with respect to cradle rail 30 and transport frame 14 becomes more apparent. Hay dog control links 46 (FIG. 3) are pivotally mounted by pivots 49 to a hydraulically operated pushrod 42. Hay dogs 50 are pivotally mounted to both hay dog control link 46 at pivots 60 and to carriage side beams 35 at pivots 62. Thus, when hydraulic cylinder 38 (shown most clearly in FIG. 1) is activated, control links 46 move rearwardly in the direction indicated by arrows 64. The pivot connections through hay dogs 50 cause hay dogs to extend into hay bale 62 as shown in FIG. 3. Continued rearward movement of control links 46 pulls carriage 34 rearwardly to move one or more hay bales to a new position within transport frame 14 or, more specifically, on cradle 26 (shown most clearly in FIG. 1). Thus, carriage 34 may be used to move hay bales from one position to another within transport frame 14 on cradle 26. The present embodiment preferably has space or positions for up to about three full-length hay bales or four shortened hay bales. In other words, transport frame 14 has three different axially spaced regions for transporting three hay bales, thereby significantly decreasing the number of trips and time required for moving multiple numbers of hay bales.

Carriage 34 could be constructed in other ways to effect the same grabbing and moving purpose. For instance, the carriage could have a vertical end stop at a front portion of the carriage for pulling hay bales with the end stop rather than or in addition to the hay dogs, as discussed above. Other means for sliding bales from one position to another include the tilting nature of cradle 26 with respect to transport frame 14, as discussed subsequently.

Some additional features are shown in FIGS. 2 and 3 besides the carriage assembly. For instance, stacking/retaining fork 66 is used as a stop or end member for the hay bales to prevent further rearward movement. Fork 66 can be released as shown subsequently for distribution of single hay bales. Side rails 68 for transport frame 14 can also be used as desired. Tandem wheels 16 are preferably mounted to transport frame 14 by springs such as leaf springs 70. Hinge or pivot connection 71 is used for tilting cradle 26 with power supplied by hydraulic piston 73. Hydraulic piston 73 is secured to transport frame 14 by pivotal means 75 on bracket 77. Hydraulic pushrod 79 is pivotally secured to cradle 26 at pivot connection 81 on cradle brackets 84 that support cradle rails 28 and 30. The cradle tilt actuation components are shown in operation in FIGS. 7 and 8.

Figure 5:
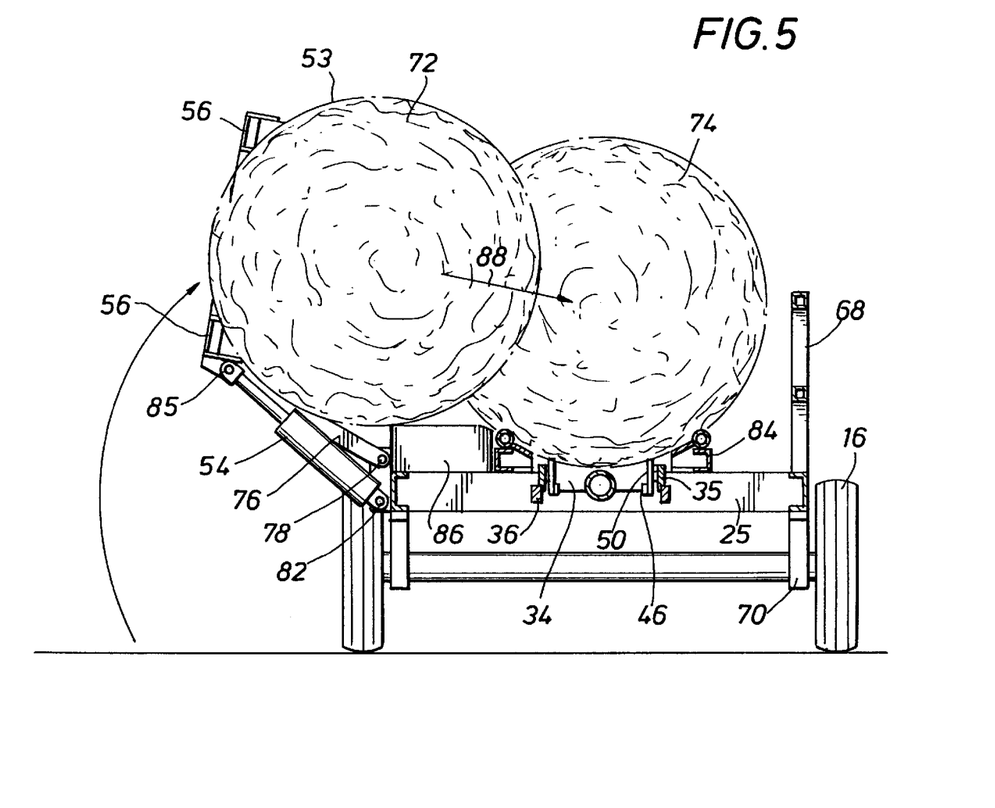
FIG. 5 is an elevational view, partially in section, of the hay bale transport apparatus of FIG. 4, wherein the lift is in an upper tilted position for moving the hay bale onto the cradle.

FIGS. 4 and 5 show operation of bale fork or lift 52. Bale fork 52 is also shown from the top in FIG. 1. As noted previously, transporter 10 is moved forward so that tines 56 slip under the hay bale until the base or end of the hay bale encounters bale stop 58. At that time, the hay bale, such as hay bale 72, indicated in FIG. 4, can be lifted by the bale lateral side or surface 53 onto transport frame 14. In FIG. 4, another hay bale 74 is already carried on transport frame 14 or, more specifically, is supported between cradle rails 28 and 30. Bale 74 has already been moved rearwardly on cradle rails 28 and 30, to which slip boards 32 are preferably secured to promote easier sliding of the hay bales.

In operation, lift 52 moves from a first lower position shown in FIG. 4 to a second upper position, as shown in FIG. 5. One or more hydraulic cylinders, such as hydraulic cylinder 54, are used to provide power for moving lift 52 from the surface position below transport frame 14 shown in FIG. 3 to the loading position above transport frame 14 shown in FIG. 4. Hydraulic cylinder 54 is preferably secured to transport frame 14 with pivots on each end, such as frame pivot 82 and lift pivot connection 85. Struts 76 are fixably secured to lift 52 and pivotally connected to transport frame 14 with pivot connections such as pivot connection or hinge 78. Suitable brackets, such as brackets 80, are welded or otherwise secured to transport frame 14 for mounting of struts 76 and/or hydraulic cylinder 54 thereto. As lift 52 is raised, tines 56 are tilted with respect to each other to urge hay bale 72 onto cradle 26. It will be understood that while two tines 56 are used as in a fork/bale lift manner, other numbers of tines or a larger single tine may be suitable for applications of the present invention, as desired. Ramp 86 (FIG. 3) is preferably provided to guide hay bale 72 onto cradle 26 as indicated in the direction of arrow 88.

FIGS. 4 and 5 also provide additional details of construction of cradle 26, where it can be seen that rails 28 and 30 may be mounted on rails or brackets 84. Similar brackets 84 are welded or otherwise secured to both left and right rails 28 and 30. As discussed previously, cradle 26 is pivotal with respect to transport frame 14 so that brackets 84 are preferably resting, but not affixed, to transport frame 14, such as on cross bars 23 and 25. On the other hand, beams, tracks, or rails 36 for slidingly supporting carriage 34 are shown mounted securely in a suitable manner to transport frame 14, such as to crossbars 23 and 25.

Figure 6:
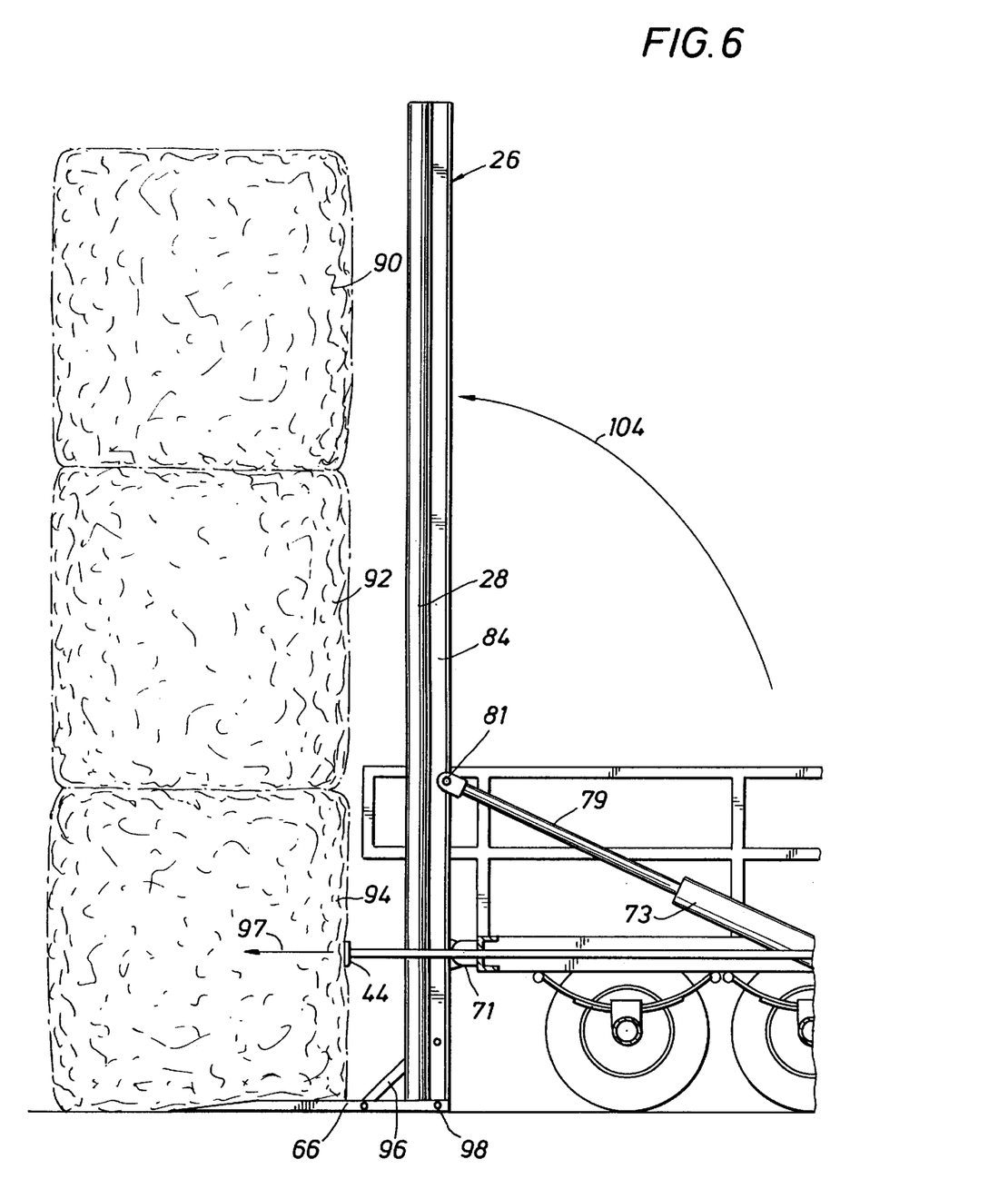
FIG. 6 is an elevational view, partially in section, of the hay bale transport apparatus of FIG. 1 with the cradle tilted for unloading an entire stack of hay bales at one time.
Figure 7:
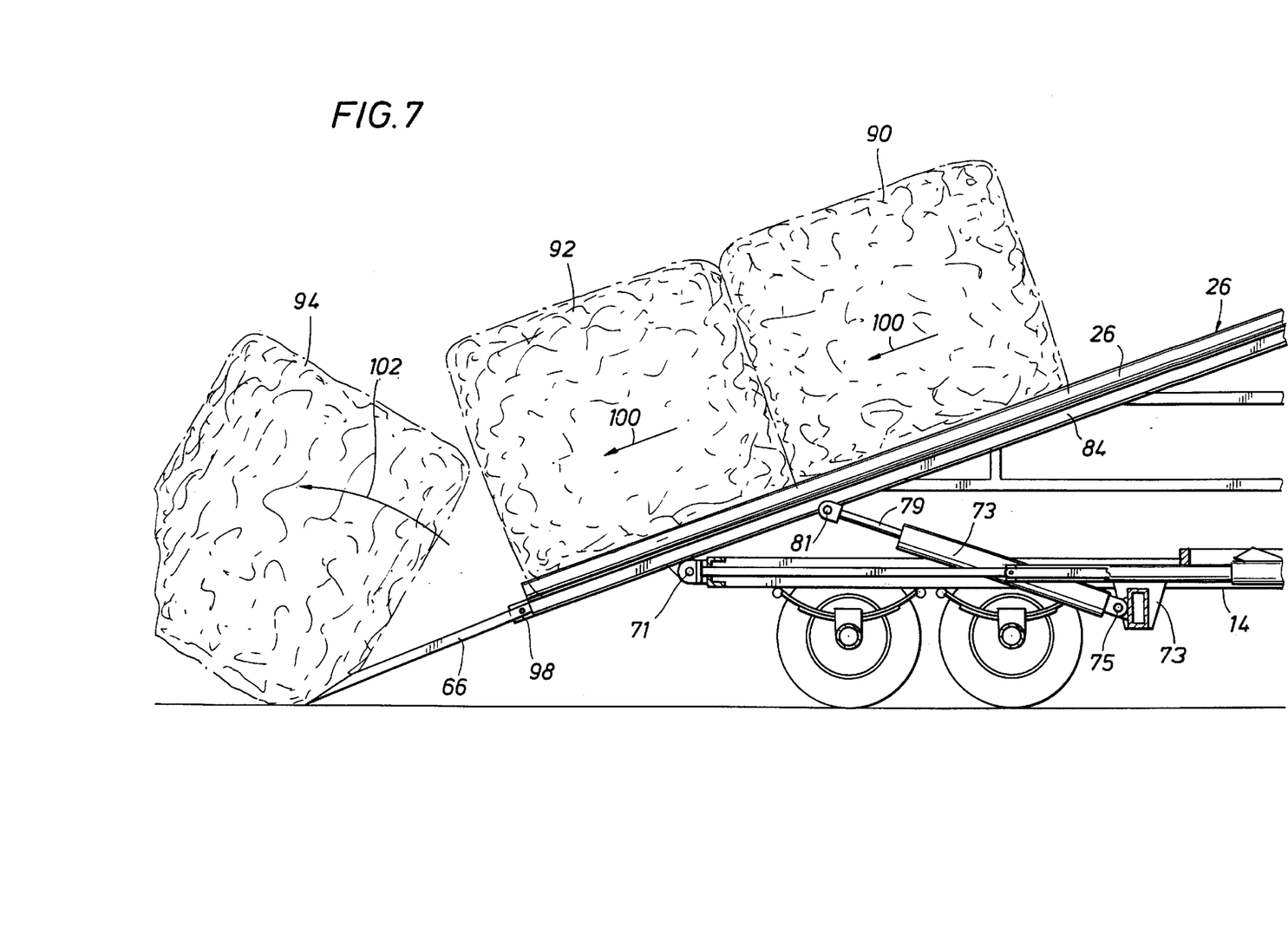
FIG. 7 is an elevational view, partially in section, of the hay bale transport apparatus of FIG. 1, with the cradle tilted for unloading single hay bales.

FIGS. 6 and 7 indicate different modes of unloading in accord with the present invention. FIG. 6 indicates how unloading may occur to provide that three hay bales 90, 92, and 94 are left in a vertical stack. FIG. 7 shows how hay bales 90, 92, and 94 may be dispersed singly or in multiples without stacking of the bales. As cradle 26 is tilted with respect to transport frame 14, bales may remain either in a stacked position, as shown in FIG. 6, or may slide off cradle 26, depending on the position of stacking/retaining fork 66, which may be in an up position, as shown in FIG. 6, supported by brace 96, or in a down position, as shown in FIG. 7, with brace 96 removed.

If it is desired to deposit the hay bales in a stacked position, then cradle 26 is moved as indicated by arrow 104 to a substantially vertical position with respect to the ground and with respect to transport frame 14. For this purpose, hydraulic cylinder 73 is activated to move pushrod 79 to an extended position as compared to the unextended position indicated in FIG. 2. As pushrod 79 is extended, cradle 26 pivots around pivots or hinges 71. Pushrod 79 is connected to cradle 26 with a pivot connection to allow pivotal movement of cradle 26 with respect to pushrod 79 as rotation occurs. Since the hay bales were substantially aligned coaxially when cradle 26 was in the horizontal position of FIG. 2, they remain substantially aligned when moved to the vertical position. Means for positively ensuring such alignment are also provided in accord with the present invention, as discussed hereinafter. Depositing of the stack of hay bales consists substantially of simply moving transport frame 14 forward. To assist movement of the stacking/retaining fork 66 from under stacked hay bales, the tractor or other pulling vehicle is put in neutral, and plate 44 is activated in the direction of arrow 97 to push against lowermost bale 94, which results in pushing the tractor and transport frame away from the stacked hay bales.

For an alternative depositing method in accord with the present invention, brace 96 may be removed as suggested in FIG. 7, so that stacking/retaining fork is pivotal due to pivot connection 98 to the down position so that hay bales 90 and 92 may move downwardly and rearwardly as indicated by arrows 100. In this method, hydraulic pushrod 79 is activated by hydraulic cylinder 73 to thereby rotate cradle 26 on pivot 71 to a desired tilted position of cradle 26 with respect to transport frame 14. With stacking/retaining fork 66 in the lowered position, a tilted position may be hydraulically selected that causes the hay bales to slide downwardly by gravity. As the most rearward hay bale reaches the ground, it may roll off, as indicated by arrow 102. Off-loading as per the method of FIG. 7 may be assisted by forward motion of transport frame 14 or pulsed operation of the hydraulic control lever (not shown). Stacking/retaining fork 66 could also be removed in this method but less protection of the hay bales is given as the hay bales fall a certain distance from cradle 26, depending on the incline at which the bales begin to slide. If some shattering of the hay bale during off-loading is desirable to assist farm animals in feeding, then stacking/retaining fork 66 may be removed, as desired.

Figure 8:
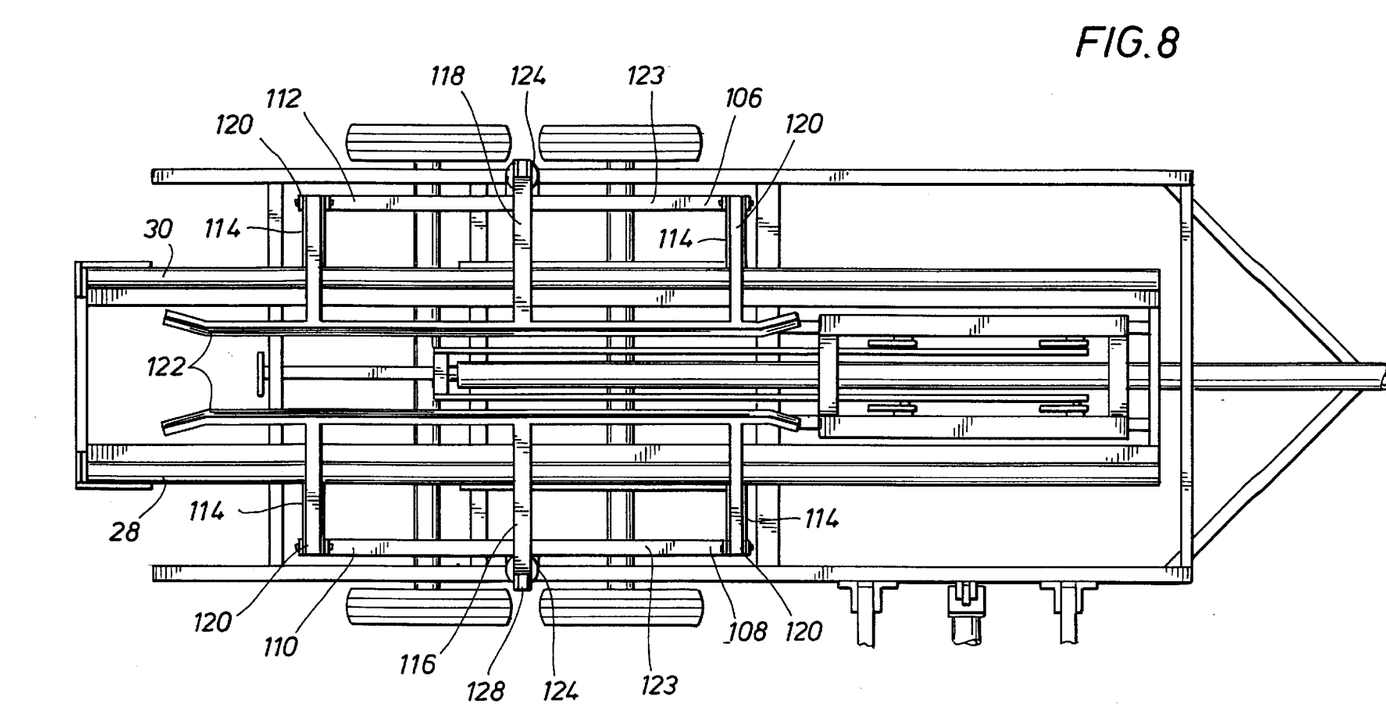
FIG. 8 is an elevational view, partially in section, of another embodiment of the present invention including stabilizer arms.
Figure 9:
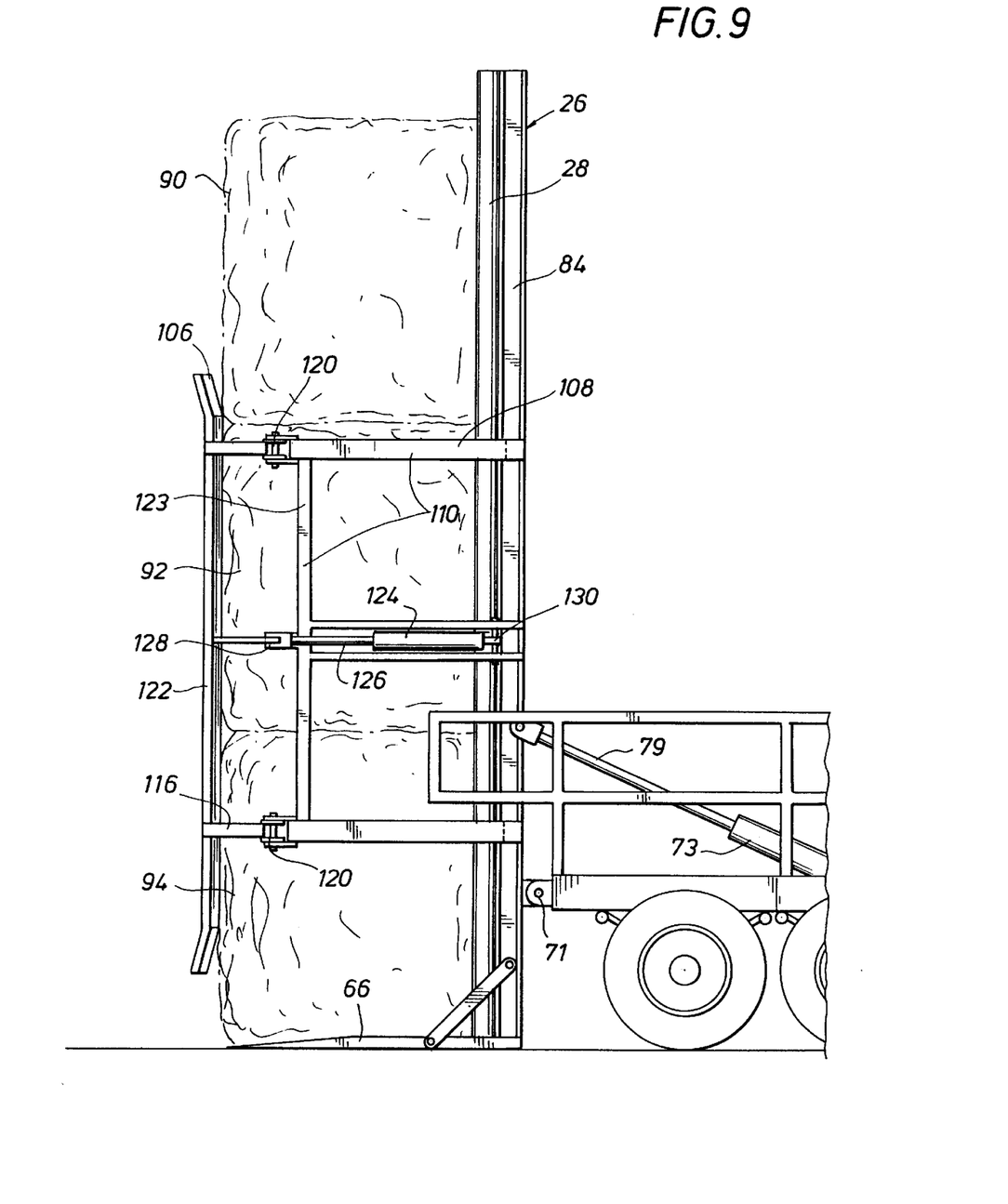
FIG. 9 is an elevational view of the embodiment of FIG. 8 with stabilizer arms for supporting hay bales in a stacked position to assist in unloading/loading an entire stack of hay bales at one time.
Figure 10:
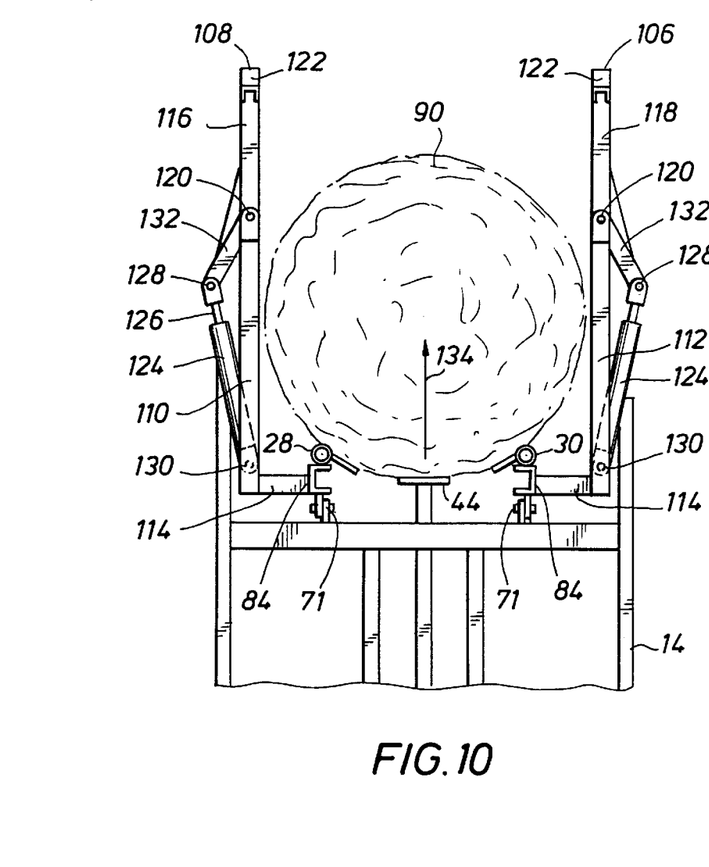
FIG. 10 is a top view, partially in section, wherein the cradle is in a vertical position and the stabilizer arms are in an open position.
Figure 11:
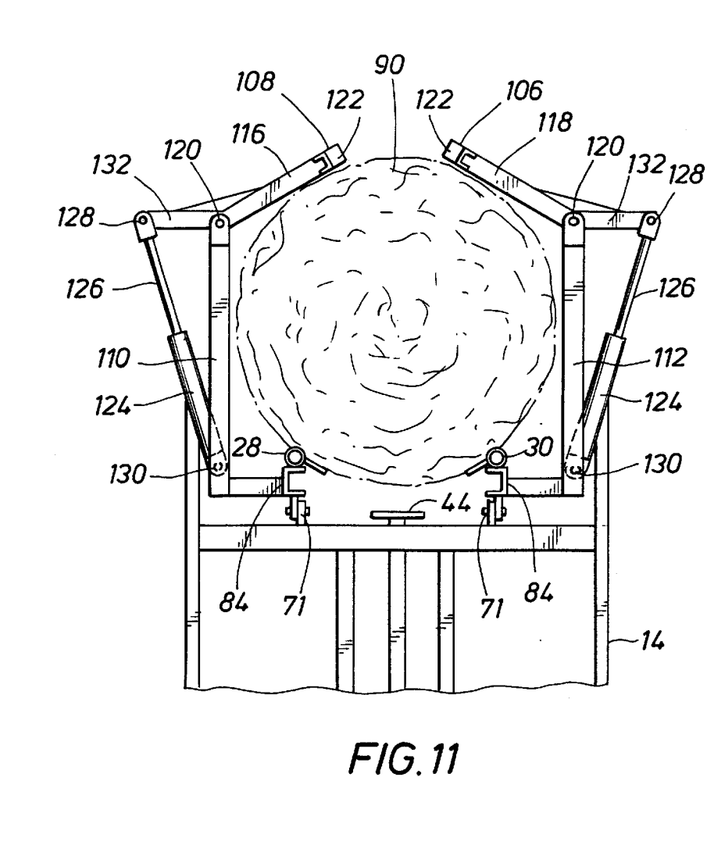
FIG. 11 is a top view, partially in section, of the embodiment as shown in FIG. 10 with stabilizer arms in the closed position.

FIGS. 8, 9, 10, and 11 essentially disclose another embodiment of the present invention wherein stabilizers may be used to provide positive stacking and/or retrieving of bales of hay. It is believed that no other prior art devices are capable of working with stacks of hay bales wherein all hay bales in a stack can be simultaneously loaded, moved, and off-loaded in accord with the present invention. FIG. 8 is similar to the view FIG. 1, except for the addition of preferably two stabilizer arms 106 and 108. While one arm, especially with enhanced dimensions, could be operable, the present invention preferably uses two arms. FIG. 9 is similar to the view of FIG. 6, except stabilizer arms 106 and 108 are enclosed around hay bales 90, 92, and 94. FIGS. 10 and 11 show a top view of stabilizer arms 106 and 108 in the open and closed positions for working with stacks of hay bales.

With reference to FIGS. 8, 9, 10, and 11, wherein arms 106 and 108 are described for this embodiment of the invention, there are shown fixed frame portions 110 and 112 that are secured to cradle brackets 84 that support cradle rails 28 and 30 by girders 114. Movable arm portions 116 and 118 are pivotally connected respectively to fixed frame portions 110 and 112, respectively, with pivots or hinges 120. Movable arm portions 116 and 118 include long end members 122 suitably long for gripping stacks of hay bales. While the present embodiment shows end members being sized to securely grip at the least two bottom hay bales 92 and 94, the length could easily be extended, if desired, to more securely grip additional hay bales, such as top hay bale 90. Fixed arm portions secured to fixed frame portions 110 and 112 may also be sized for gripping additional hay bales, as desired. For instance, bar 123 may be lengthened for this purpose. Associated hydraulic cylinders and pushrods 124 and 126, respectively, are used to operate arms 106 and 108. Hydraulic cylinders and pushrods 124 and 126 are pivotally mounted to fixed and movable arm portions by means of pivot connections 128 and 130, respectively. Bell crank arms 132 may be used for controlling arms 106 and 108. As with other operating constructions discussed hereinbefore, bell crank arms or other levers or leverage mechanisms may be used for effecting operation. Bell crank arms 132, in the present embodiment, are pivotally connected to fixed frame portions 110 and 112 and fixably secured to movable arm portions 116 and 118.

In operation, cradle 26 is moved vertically to either receive or deposit a stack of hay bales, such as a stack comprising hay bales 90, 92, and 94. Plate 44 may be activated for removal of the stack of hay bales as discussed previously. The size of plate 44 may be made to be most suitable for the application desired. Plate 44 is made to move the stack of hay bales in the direction indicated by arrow 134. For removal or pickup of one or more bales of hay, the arms open, as shown in FIG. 10, once cradle 26 is moved to the vertical position. At other times, the arms preferably remain in the closed position, as indicated in FIG. 11. When picking a stack of bales up with the cradle in the vertical position, the arms may be closed upon the bales or stack of bales to assist in movement of the bales onto the cradle. Transport frame 14 may either be moved forward or backward, depending on whether off-loading or pickup is desired. While arms 106 and 108 are especially useful for loading and unloading stacks of hay bales, they can also be used for working with single bales.

To pick up a stack of hay bales, the transport frame is moved rearwardly or in the reverse direction so that stacking/retaining fork 66 is moved under bottom hay bale, such as hay bale 94. Arms 106 and 108 are open while moving stacking/retaining fork 66 under the stack of hay bales (or single hay bale). After stacking/retaining fork 66 is substantially underneath the stack of hay bales, then arms 106 and 108 are closed to secure the stack of hay bales and to move them any additional amount onto cradle 26, preferably while reversing. Cradle 26 may then be lowered to the horizontal position for transport.

The foregoing disclosure and description of the invention is illustrative and explanatory thereof, and it will be appreciated by those skilled in the art that various changes in the size, shape, and materials, as well as in the details, of the illustrated construction or combinations of features of the various hay bale transport elements may be made without departing from the spirit of the invention.

What is claimed is:

1. An apparatus for moving at least one large bulky object resting on a surface from a first location to a second location, said apparatus comprising:

a transport frame for carrying said at least one large bulky object, said transport frame being movable for transporting said at least one large bulky object from said first location to said second location, said transport frame having front and rear sides and two lateral sides, said transport frame having spaced first and second regions with each of said first and second regions being sized for receiving said at least one large bulky object;

a cradle pivotally secured to said transport frame for slidably receiving said at least one large bulky object;

a carriage slidably movably mounted with respect to said cradle and being restricted to movement between said front and rear side of said transport frame;

a powered assembly secured to said transport frame and said carriage, said carriage being relatively movable in a forward or reverse direction with respect to said cradle responsively to said powered assembly for movement of at least one bulky object along said cradle from said first region of said transport frame to said second region of said transport frame; and a pivot connection for said cradle such that said cradle is tiltable with respect to both said transport frame and said carriage during unloading of said at least one bulky object.

2. The apparatus of claim 1, wherein said cradle further comprises:

at least two rails secured to said frame for slidably receiving said at least one large bulky object.

3. The apparatus of claim 2, wherein said cradle further comprises:

slip surfaces for said at least two rails for slidably supporting said at least one large bulky object.

4. The apparatus of claim 1, further comprising:

a lift mounted to one of said two lateral sides for lifting said at least one large bulky object from said surface for placement onto said cradle.

5. The apparatus of claim 1, further comprising:

extendable/retractable spike members attached to said carriage for engagement/disengagement with said at least one bulky object to thereby assist said movement of said at least one bulky object from said first region of said transport frame to said second region of said transport frame.

6. The apparatus of claim 1, wherein the powered assembly includes a hydraulic cylinder interconnected between said transport frame and said carriage.

7. The apparatus of claim 1, further comprising:

wheels provided on tandem axles supporting said transport frame to allow said transport frame to be movable from said first location to said second location.

8. The apparatus of claim 1, further comprising:

a powered lifting assembly mounted to at least one of said two lateral sides of said transport frame and extendable in a lateral direction from said at least one of said two lateral sides for loading said at least one large bulky object resting on the surface onto said cradle.

9. An apparatus operable for moving at least two hay bales simultaneously, said apparatus comprising:

a transport frame sized for carrying said at least two hay bales, said transport frame being movable for transporting said at least two hay bales, said transport frame having front and rear sides and two lateral sides;

a cradle secured to said transport frame for slidably receiving said at least two hay bales;

a pivot connection for said cradle such that said cradle is tiltable with respect to said transport frame from a first position to a second position; and a pair of arms movably secured to said cradle sized for grippingly holding said at least two hay bales as said cradle is tilted from said first position to said second position, each of said arms being positioned on a respective one of the lateral sides of the transport frame, each of said arms having a first arm portion fixed to and extending from said cradle and a second arm portion pivotally supported on an end of said first arm portion; and a pair of hydraulic cylinders each for pivoting a respective one of said second arm portions from a disengaged position wherein said second arm portion is substantially disengaged from said at least two hay bales to an engaged position wherein said second arm portion is spaced laterally closer to an opposing first arm portion than the supporting first arm portion is spaced from said opposing first arm portion, such that the second arm portions engage said at least two bales to apply a force directed toward the cradle.

10. The apparatus of claim 9, further comprising:

a stacking end secured to said cradle for supporting weight of said two hay bales as said cradle is tilted from said first position to said second position.

11. The apparatus of claim 10, further comprising:

an end pivot connection between said stacking end and said cradle such that said stacking end is pivotal with respect to said cradle.

12. The apparatus of claim 9, further comprising:

pivots for said arms secured to said cradle, said arms being movable laterally with respect to said cradle between an open release position and a closed gripping position.

13. The apparatus of claim 9, further comprising:

a link member for interconnecting each of the pair of hydraulic cylinders with a respective one of said second arm portions.

14. The apparatus of claim 9, further comprising:

wheels provided on tandem axles supporting said transport frame to allow said transport frame to be movable.

15. The apparatus of claim 9, further comprising:

a powered lifting assembly mounted to at least one of said two lateral sides of said support frame and extendable in a lateral direction from said at least one of said two lateral sides for loading one of said at least two hay bales onto the cradle.

16. An apparatus for moving at least one hay bale resting on a surface from a first location to a second location, said apparatus comprising:

a transport frame for carrying said at least one hay bale, said transport frame being movable for transporting said at least one hay bale from the first location to said second location, said transport frame having front and rear sides and two lateral sides each residing in a substantial horizontal plane;

a cradle pivotally secured to said rear side of said transport frame for receiving said at least one hay bale;

a powered assembly secured to said transport frame and said cradle for moving said cradle from a first lowered position wherein said cradle is in a substantially horizontal position to a second raised position wherein said cradle is substantially perpendicular to said transport frame for unloading said at least one hay bale; and a push plate movable relative to said transport frame to exert a pushing force on said at least one hay bale when said cradle is in said second raised position, such that said push plate moves said at least one hay bale off said cradle when unloading said at least one hay bale.

17. The apparatus of claim 16, wherein the power assembly comprises:

a powered hydraulic cylinder secured to said transport frame for moving said push plate relative to said transport frame.

18. The apparatus of claim 17, further comprising:

a carriage slidably movable with respect to said cradle for moving said at least one hay bale along said cradle from a first region to a second region.

19. The apparatus of claim 18, wherein the power assembly comprises:

a powered hydraulic cylinder for simultaneously moving both said carriage and said push plate relative to said transport frame.

20. The apparatus of claim 16, further comprising:

an extendable rod for moving said push plate, said extendable rod lying substantially within the plane of the horizontal transport frame.

21. The apparatus of claim 20, further comprising:

wheels provided on tandem axles supporting said support frame to allow said support frame to be movable from said first location to said second location.

22. The apparatus of claim 16, further comprising:

a stacking fork pivotally secured to said cradle for supporting said at least one hay bale when unloading said at least one hay bale.

23. The apparatus of claim 22, further comprising:

a brace for interconnecting said stacking fork and said carriage.

24. The apparatus of claim 16, further comprising:

a powered lifting assembly mounted to at least one of said two lateral sides of said support frame and extendable in a lateral direction from said at least one of said two lateral sides for loading said at least one hay bale onto the cradle.

* * * * *